US010558748B2

(12) United States Patent
Bostick et al.

(10) Patent No.: US 10,558,748 B2
(45) Date of Patent: Feb. 11, 2020

(54) RECOGNIZING TRANSLITERATED WORDS USING SUFFIX AND/OR PREFIX OUTPUTS

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); Martin G. Keen, Cary, NC (US); Craig M. Trim, Sylmar, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 87 days.

(21) Appl. No.: 15/800,261

(22) Filed: Nov. 1, 2017

(65) Prior Publication Data

US 2019/0129935 A1    May 2, 2019

(51) Int. Cl.
| | | |
|---|---|---|
| *G06F 17/27* | (2006.01) | |
| *G06F 16/951* | (2019.01) | |
| *G06F 16/33* | (2019.01) | |
| *G06F 17/28* | (2006.01) | |
| *G10L 15/197* | (2013.01) | |
| *G06F 16/31* | (2019.01) | |

(52) U.S. Cl.
CPC ...... *G06F 17/2735* (2013.01); *G06F 16/3332* (2019.01); *G06F 16/951* (2019.01); *G06F 17/273* (2013.01); *G06F 17/276* (2013.01); *G06F 17/28* (2013.01); *G06F 16/31* (2019.01); *G10L 15/197* (2013.01)

(58) Field of Classification Search
CPC .............................. G06F 17/273; G06F 17/28

USPC ............................................................ 704/2
See application file for complete search history.

(56) References Cited

U.S. PATENT DOCUMENTS

| 6,047,300 A * | 4/2000 | Walfish ................. G06F 17/273 |
|---|---|---|
| | | 715/257 |
| 6,714,906 B1 | 3/2004 | Ji et al. |
| 7,409,334 B1 | 8/2008 | Shoemaker |
| (Continued) | | |

OTHER PUBLICATIONS

Lovins et al., "Development of a Stemming Algorithm", http://mt-archive.info/MT-1968-Lovins.pdf, Mechanical Translation and Computational Linguistics, vol. 11, Nos. 1 and 2, Electronic Systems Laboratory, Massachusetts Institute of Technology, Cambridge, Massachusetts, Mar. and Jun. 1968, 10 pages.

(Continued)

*Primary Examiner* — Shaun Roberts
(74) *Attorney, Agent, or Firm* — James Nock; Andrew D. Wright; Roberts Mlotkowski Safran Cole & Calderon, P.C.

(57) ABSTRACT

A computer-implemented method includes: receiving, by a computing device, an input file defining correct spellings of one or more transliterated words; generating, by the computing device, suffix outputs based on the one or more transliterated words; generating, by the computing device, a dictionary that maps the suffix outputs to the one or more transliterated words; recognizing, by the computing device, an alternatively spelled transliterated word included in a document as one of the one or more correctly spelled transliterated words using the dictionary; and outputting, by the computing device, information corresponding to the recognized transliterated word.

25 Claims, 10 Drawing Sheets

(56) References Cited

U.S. PATENT DOCUMENTS

| | | | |
|---|---|---|---|
| 7,539,611 B1* | 5/2009 | Wyckoff | G06F 17/271 704/1 |
| 8,015,175 B2 | 9/2011 | Fairweather | |
| 8,224,836 B1* | 7/2012 | Piratla | G06F 16/951 707/759 |
| 8,275,600 B2* | 9/2012 | Bilac | G06F 17/2863 704/2 |
| 9,176,936 B2* | 11/2015 | Jan | G06F 17/2223 |
| 10,394,960 B2* | 8/2019 | Pino | |
| 2001/0029455 A1* | 10/2001 | Chin | G06F 17/273 704/277 |
| 2006/0074885 A1 | 4/2006 | Chiu et al. | |
| 2006/0080082 A1* | 4/2006 | Ravindra | G06F 9/454 704/8 |
| 2006/0173886 A1 | 8/2006 | Moulinier et al. | |
| 2008/0221866 A1* | 9/2008 | Katragadda | G06F 17/2223 704/8 |
| 2009/0083028 A1* | 3/2009 | Davtchev | G06F 17/273 704/9 |
| 2009/0144049 A1* | 6/2009 | Haddad | G06F 17/2223 704/3 |
| 2010/0185670 A1* | 7/2010 | Krishnan | G06F 17/2223 707/776 |
| 2012/0041751 A1* | 2/2012 | Elfeky | G06F 17/2223 704/2 |
| 2012/0297294 A1* | 11/2012 | Scott | G06F 17/273 715/261 |
| 2013/0047149 A1* | 2/2013 | Xu | G06F 8/61 717/175 |
| 2013/0144592 A1* | 6/2013 | Och | G06F 17/273 704/2 |
| 2013/0283156 A1* | 10/2013 | Al Badrashiny | G06F 17/273 715/257 |
| 2014/0273999 A1* | 9/2014 | Mottes | H04W 4/14 455/414.4 |
| 2014/0281943 A1* | 9/2014 | Prilepov | G06F 17/2735 715/257 |
| 2016/0217782 A1* | 7/2016 | Fume | G10L 13/08 |
| 2016/0275941 A1 | 9/2016 | Bellegarda et al. | |
| 2017/0116175 A1* | 4/2017 | Alter | G06F 17/2223 |
| 2017/0300475 A1* | 10/2017 | Ittycheriah | G06F 17/27 |

OTHER PUBLICATIONS

Kraaij et al., "Viewing Stemming as Recall Enhancement", https://pdfs.semanticscholar.orgc25b/617cb9c3409a75540bf71742bba9033f3e74.pdf, Proceedings of the 19th annual international ACM SIGIR conference on Research and development in information retrieval, ACM, 1996, 9 pages.

Porter, "Snowball: A language for stemming algorithms", http://snowball.tartarus.org/texts/introduction.html, Oct. 2001, 14 pages.

Savoy, "Light Stemming Approaches for the French, Portuguese, German and Hungarian Languages", http://doc.rero.ch/record/13225/files/Savoy_jacques_-_Light_Stemming_Approaches_fo_the_French_20091216.pdf, Proceedings of the 2006 ACM symposium on Applied computing, ACM, 2006, 5 pages.

Mell et al., "The NIST Definition of Cloud Computing", NIST, Special Publication 800-145, Sep. 2011, 7 pages.

Anonymous, "Stemming", https://en.wikipedia.org/wiki/Stemming, Wikipedia, Accessed Nov. 1, 2017, 7 pages.

Hipke, "Understanding Endeca Internationalization and Linguistic Analysis", https://www.cirrus10.com/2014/02/26/oracle-language-technologyoracle-commerce-11/, Blog Search Practice, Feb. 26, 2014, 15 pages.

"List of IBM Patents or Patent Applications Treated as Related", dated Dec. 13, 2019, 1 page.

Specification "Recognizing Transliterated Words Using Suffix and/or Prefix Outputs" and drawings in related U.S. Appl. No. 16/694,290, filed Nov. 25, 2019, 51 pages.

\* cited by examiner

RECOGNIZING TRANSLITERATED WORDS USING SUFFIX AND/OR PREFIX OUTPUTS

BACKGROUND

The present invention generally relates to recognizing transliterated words and, more particularly, to recognizing transliterated words having inconsistent or alternative spellings.

Electronic documents (including e-mails, texts, etc.) may include transliterated words that originate from a different language than the words in a primary language of the document. For example, a document may be written in English, but may include words in the Russian language (e.g., if the document is written for an English-speaking audience, but references Russian names, cities, sites, etc.).

When writing an electronic document in a primary language (e.g., English), often times, different writers may spell a transliterated word differently, or may mistype the transliterated word. As such, recognizing different and inconsistent spellings of transliterated word can be problematic, particularly in data analysis systems, spellcheck/autocorrect systems, and/or other types of systems in which the recognition of transliterated words is crucial.

Word recognition may often rely on determining a language of a document, which can be problematic when a document includes words from different languages. Moreover, word recognition may require the use of a stemmer, which may or may not exist for a language, and may not properly identify a word.

SUMMARY

In an aspect of the invention, a computer-implemented method includes: receiving, by a computing device, an input file defining correct spellings of one or more transliterated words; generating, by the computing device, suffix outputs based on the one or more transliterated words; generating, by the computing device, a dictionary that maps the suffix outputs to the one or more transliterated words; recognizing, by the computing device, an alternatively spelled transliterated word included in a document as one of the one or more correctly spelled transliterated words using the dictionary; and outputting, by the computing device, information corresponding to the recognized transliterated word. Advantageously, alternatively spelled transliterated words included in an electronic document may be properly recognized. In a further aspect, the method may include generating candidate suffixes for each of the one or more transliterated words included in the input file. The generating the suffix outputs may be based on the generating the candidate suffixes. The method may further include generating a trie based on the suffix outputs. The generating the dictionary is based on generating the trie.

In an aspect of the invention, there is a computer program product for recognizing alternatively spelled transliterated words in a document. The computer program product includes a computer readable storage medium having program instructions embodied therewith, the program instructions executable by a computing device to cause the computing device to: receive input including an alternatively spelled transliterated word; identify that the alternatively spelled transliterated word includes a suffix in a transliterated word recognition dictionary that maps the suffix to a plurality of correctly spelled transliterated words; identify a particular one of the plurality of correctly spelled transliterated words that corresponds to the alternatively spelled transliterated word; and output information corresponding to the particular one of the plurality of correctly spelled transliterated words. Advantageously, alternatively spelled transliterated words included in an electronic document may be properly recognized. The identifying the particular one of the plurality of correctly spelled transliterated may include: identifying a prefix in the alternatively spelled transliterated word; and mapping the identified prefix with a prefix of the particular one of the plurality of correctly spelled transliterated words.

In an aspect of the invention, a system comprises: a CPU, a computer readable memory and a computer readable storage medium associated with a computing device; program instructions to receive an input file identifying correct spellings of one or more transliterated words; program instructions to generate prefix outputs based on the one or more transliterated words; program instructions to generate a dictionary that maps the prefix outputs to the one or more transliterated words; program instructions to recognize an alternatively spelled transliterated word included in a document as one of the one or more correctly spelled transliterated words using the dictionary; and program instructions to output information corresponding to the recognized transliterated word. The program instructions are stored on the computer readable storage medium for execution by the CPU via the computer readable memory. Advantageously, alternatively spelled transliterated words included in an electronic document may be properly recognized. The program instructions to recognize the alternatively spelled transliterated word may include: program instructions to identify that a prefix in the alternatively spelled transliterated word is included in the dictionary; program instructions to identify a suffix in the alternatively spelled transliterated word; and program instructions to map the suffix to a particular one of the one or more transliterated words in the input file.

In an aspect of the invention, a computer-implemented method includes: receiving, by a computing device, an input file defining correct spellings of one or more transliterated words; generating, by the computing device, a dictionary that maps suffix outputs or prefix outputs to the one or more transliterated words; recognizing, by the computing device, an alternatively spelled transliterated word included in a document as one of the one or more correctly spelled transliterated words using the dictionary; and outputting, by the computing device, information corresponding to the recognized transliterated word. Advantageously, alternatively spelled transliterated words included in an electronic document may be properly recognized. The outputting the information corresponding to the recognized transliterated word may include performing data analysis based on the recognized transliterated word instead of based on the alternatively spelled transliterated word In an aspect of the invention, there is a computer program product for recognizing alternatively spelled transliterated words in a document. The computer program product includes a computer readable storage medium having program instructions embodied therewith, the program instructions executable by a computing device to cause the computing device to: receive input including an alternatively spelled transliterated word; identify that the alternatively spelled transliterated word includes a prefix in a transliterated word recognition dictionary that maps the prefix to a plurality of correctly spelled transliterated words; identify a particular one of the plurality of correctly spelled transliterated words that corresponds to the alternatively spelled transliterated word; and output information corresponding to the particular one of the plurality of correctly spelled transliterated words. Advantageously, alternatively spelled transliterated words included in an electronic document may be properly recognized.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
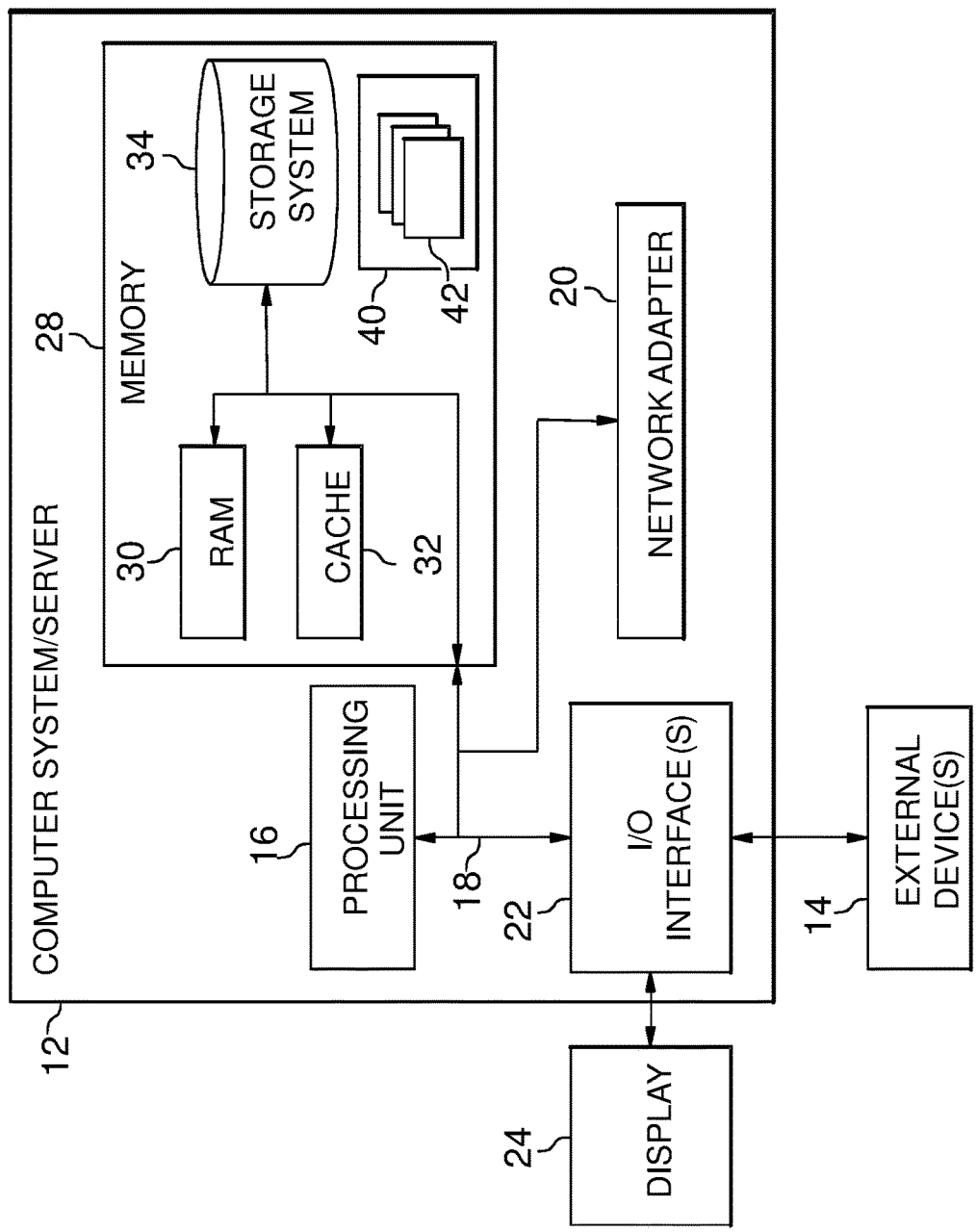
FIG. 1 depicts a cloud computing node according to an embodiment of the present invention.

The present invention generally relates to recognizing transliterated words and, more particularly, to recognizing transliterated words having inconsistent or alternative spellings. Aspects of the present invention may recognize alternative and inconsistent spellings of transliterated words that are in a different language than a primary language of an electronic document. For example, if an English-based company or organization does business in Russia, aspects of the present invention may be used to recognize transliterated Russian words or proper nouns frequently used in communications by the English-based company or organization.

In embodiments, aspects of the present invention may receive a group of input transliterated words having a correct spelling of the transliterated words, identify suffixes of the transliterated words (e.g., the last few characters in the transliterated words), analyze the suffixes to determine a set of suffix outputs having suffixes that are included in two or more of the transliterated words in the group, use the suffix outputs to generate a trie, and use the trie to generate a dictionary of suffixes that are used to recognize alternative and inconsistent spellings (e.g., misspellings, typos, etc.) of transliterated words that are present in an electronic document. For example, the dictionary may identify a set of different suffixes for a transliterated word that correspond to a particular transliterated word.

As an illustrative, non-limiting example, the dictionary may identify that the suffixes "nskoe," "nskoeye", and "koe" may correspond to the transliterated versions of the Russian words "Arlanskoye", "Urgengoy", and "Hilchuy." Based on the prefix of a transliterated word, aspects of the present invention may recognize the transliterated word even when the suffix is spelled incorrectly. For example, when a document contains the word "Arlanskoeye", aspects of the present invention may determine that the suffix in "Arlanskoeye" is "nskoeye" which is in the dictionary as mapping to either "Arlanskoye", "Urgengoy", or "Hilchuy." Since the prefix is "Arlan," the word "Arlanskoeye" would be recognized as "Arlanskyoe." As another example, the word "Hilkoe" would be recognized as "Hilchuy" since the suffix "koe" maps to either Arlanskoye", "Urgengoy", or "Hilchuy", and the prefix "Hil" maps to "Hilchuy."

Aspects of the present invention are described herein as generating a transliterated word recognition dictionary having suffixes that map to various transliterated words. However, aspects of the present invention are not limited to use with suffixes. For example, the dictionary may have prefixes that map to various transliterated words. In embodiments, prefix outputs having prefixes that are included in two or more of transliterated words in a group may be used to generate a trie, and the trie of prefixes may be used to generate a dictionary of prefixes that map to different transliterated words. The dictionary may then be used to recognize alternate spellings of a transliterated word by mapping the prefix in the dictionary and recognizing a suffix associated with the transliterated word. Also, the dictionary may include both suffixes and prefixes that map to transliterated words to further improve the recognition of the transliterated words.

Aspects of the present invention may provide a technical solution to the technical problem of recognizing alternate spellings of transliterated words. For example, aspects of the present invention may analyze a list of transliterated words, apply suffix identification algorithms to the transliterated words, identify candidate suffixes that may correspond to each of the transliterated words, and recognize alternative spellings of the transliterated words by generating a dictionary based on a trie. Aspects of the present invention may provide a technical solution to the technical problem of computer-based recognition of transliterated words for improving the accuracy of data analysis, as well as improving spellcheck/auto correct systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
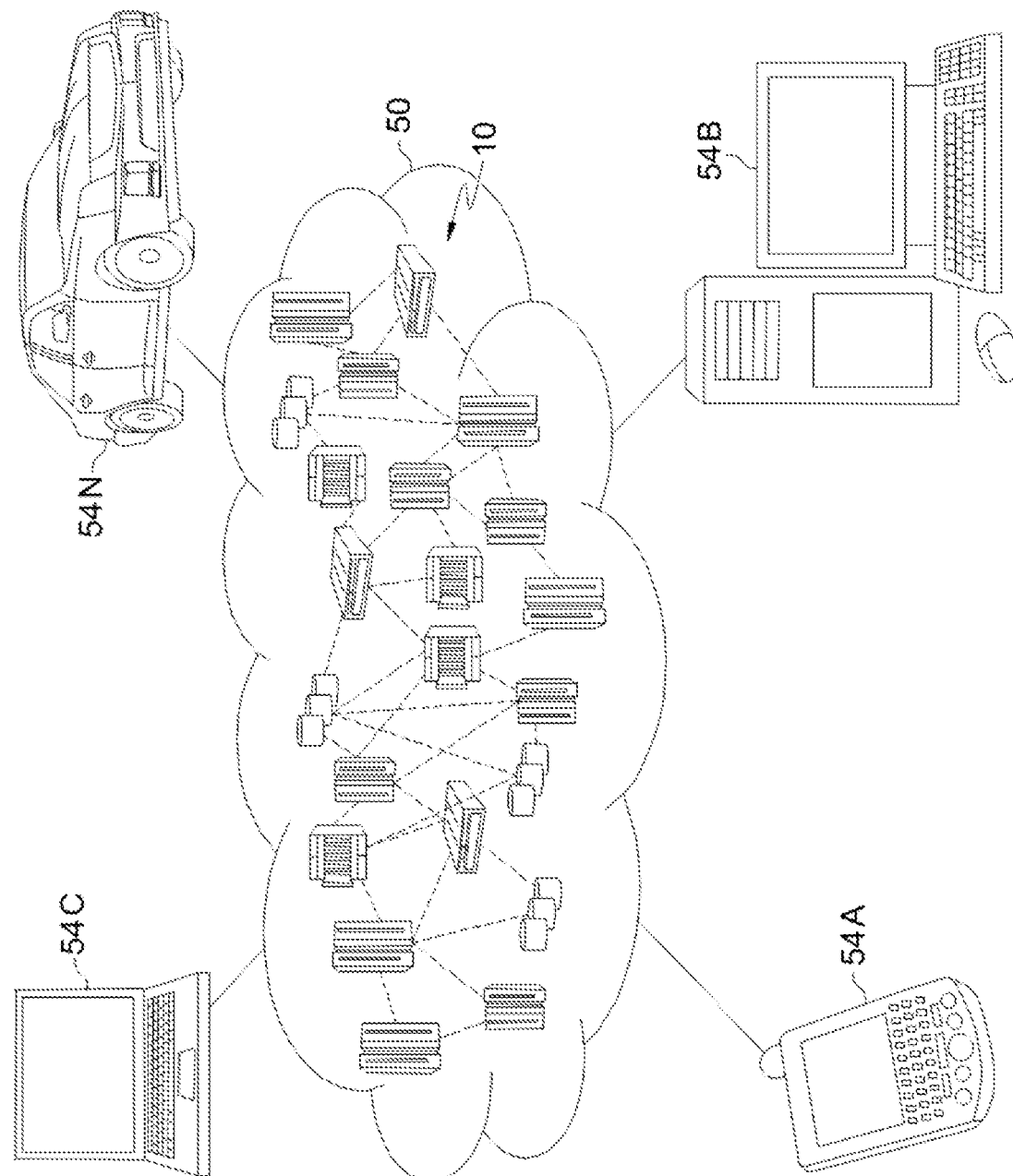
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
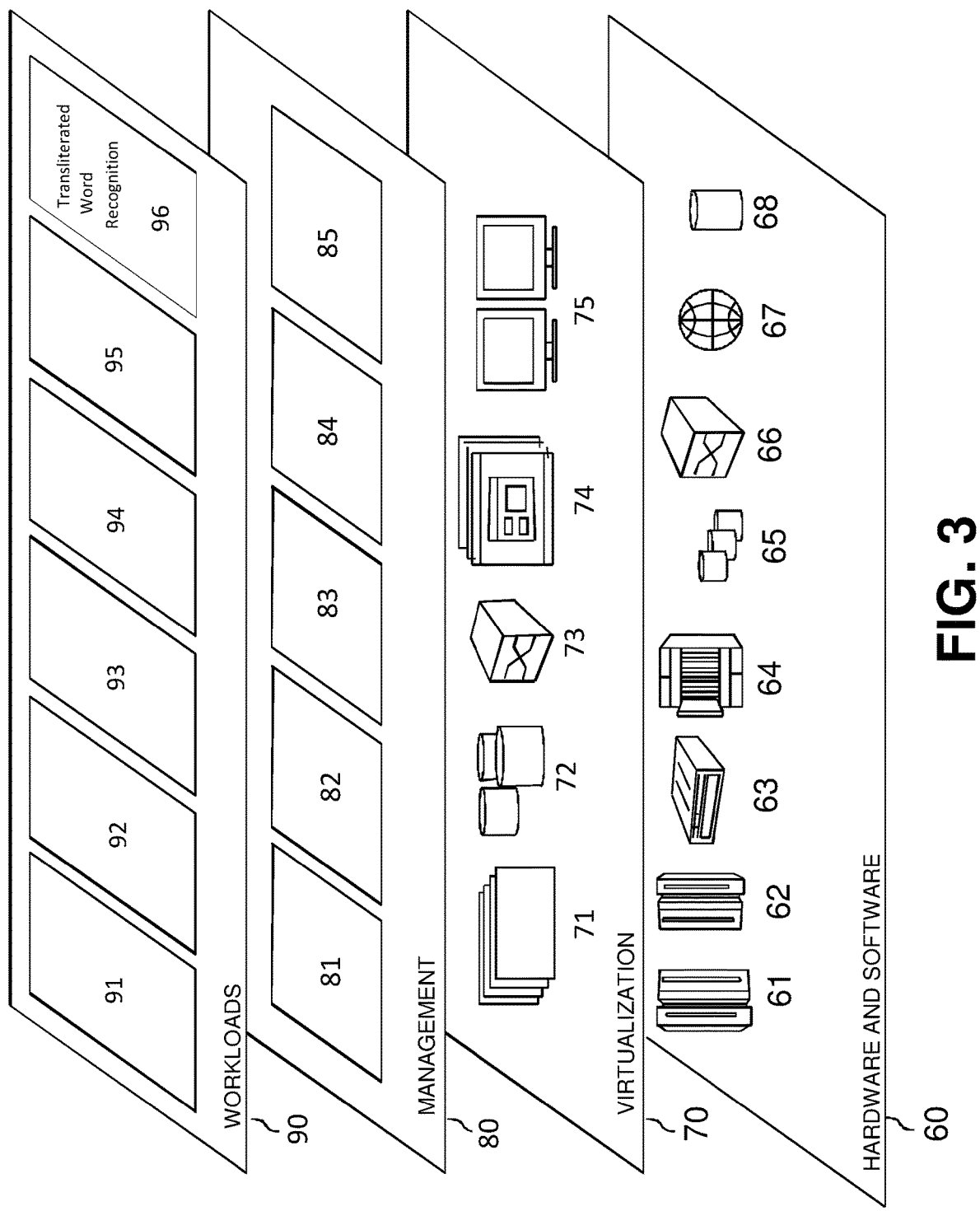
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and transliterated word recognition 96.

Referring back to FIG. 1, the program/utility 40 may include one or more program modules 42 that generally carry out the functions and/or methodologies of embodiments of the invention as described herein (e.g., such as the functionality provided by transliterated word recognition 96). Specifically, the program modules 42 may receive an input file with transliterated words, generate candidate suffixes, generate suffix outputs based on the candidate suffixes, generate a trie based on the suffix outputs, and generate a dictionary based on the trie. Other functionalities of the program modules 42 are described further herein such that the program modules 42 are not limited to the functions described above. Moreover, it is noted that some of the modules 42 can be implemented within the infrastructure shown in FIGS. 1-4. For example, the modules 42 may be representative of a transliterated word recognition system 220 shown in FIG. 4.

Figure 4:
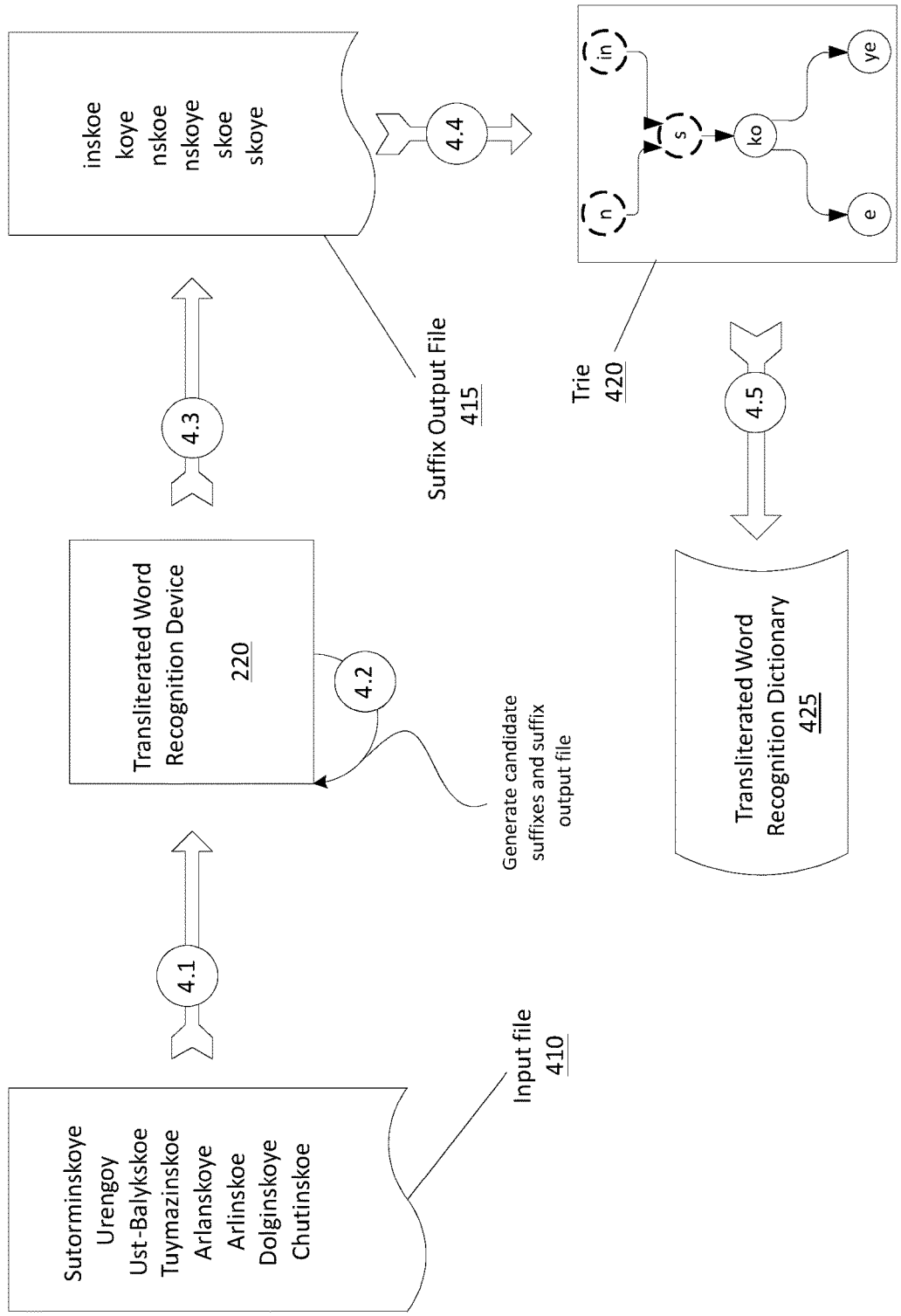
FIG. 4 shows an overview of an example implementation in accordance with aspects of the present invention.

FIG. 4 shows an overview of an example implementation in accordance with aspects of the present invention. As shown in FIG. 4, a transliterated word recognition device 220 may receive an input file 410 that contains a list of transliterated words in a non-primary language (at step 4.1). As described herein, a transliterated word may include a word that is written using the closest corresponding letters of a different alphabet or language. For example, if an English-based company or organization does business relating to oil fields in Russia, the input file 410 may include a list of transliterated words of Russian oil fields frequently used by the English-based company or organization, such as those shown in FIG. 4. In embodiments, the input file 410 may include a correct spelling (e.g., a spelling that is defined as a recognized correct spelling) of the transliterated words.

At step 4.2, the transliterated word recognition device 220 may process the input file 410 by generating candidate suffixes associated with the transliterated words from the input file 410. As described in greater detail herein, the candidate suffixes may include characters that follow the initial characters in a transliterated word. The candidate suffixes may also include a minimum number of characters (e.g., four, or other configurable number of minimum characters). For example, a candidate suffix for the transliterated word "Urengoy" would be "rengoy" in which the first character "U" has been omitted. Additional candidate suffixes would include "engoy" (in which the first and second characters have been omitted) and "ngoy" (in which the first, second, and third characters have been omitted). Once candidate suffixes for each transliterated word in the input file 410 have been generated, at step 4.3, the transliterated word recognition device 220 may generate a suffix output file 415 by applying an algorithm that identifies candidate suffixes that are present in at least two or more transliterated words. For example, one suffix in the output file 415 would include "inskoe" since the suffix "inskoe" is present in the transliterated words "Arlinskoe" and "Tuymazinskoe."

At step 4.4, the transliterated word recognition device 220 may generate a trie 420 based on the suffix output file 415. As described in greater detail herein, the trie encompasses the suffixes in the suffix output file 415, as well as additional suffixes that stem from the suffixes in the suffix output file 415. At step 4.5, the transliterated word recognition device 220 may generate a transliterated word recognition dictionary 425 based on the trie. The transliterated word recognition dictionary 425 may include all the suffixes that stem from the trie, and map those suffixes to the input transliterated words in the input file 410. The transliterated word recognition dictionary 425 may be used to recognize alternate spellings of a transliterated word that is present in an electronic document. For example, if a document contains the word "Arlanskoeye" (e.g., a misspelled or alternatively spelled version of the correctly spelled "Arlanskoye"), the transliterated word recognition device 220 may determine that the suffix in "Arlanskoeye" is "nskoeye" which is in the transliterated word recognition dictionary 425, and thus, maps to the input words in the input file 410. Since the prefix is "Arlan," the word "Arlanskoeye" would be recognized as "Arlanskyoe."

In embodiments, the transliterated word recognition device 220 may generate the transliterated word recognition dictionary 425 to include a wide range of suffixes that can be used to recognize alternative/misspelled versions of a transliterated word. In a similar manner, the transliterated word recognition device 220 may generate the transliterated word recognition dictionary 425 to include a wide range of prefixes that can be used to recognize alternative/misspelled versions of a transliterated word. The transliterated word recognition dictionary 425 may be used to recognize transliterated words in a document (e.g., a document containing data) to analyze and process the data. Additionally, or alternatively, the transliterated word recognition dictionary 425 may be used for autocorrect systems, spell check systems, etc.

Figure 5:
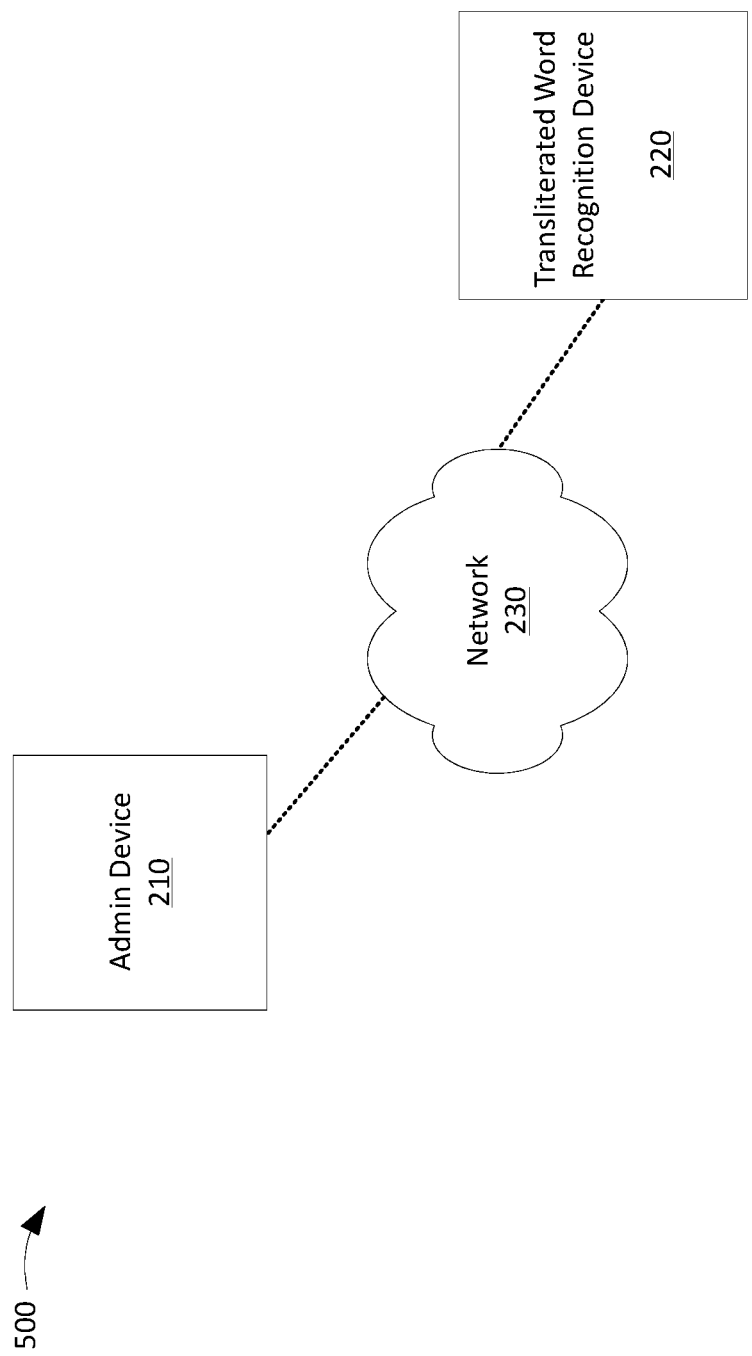
FIG. 5 shows an example environment in accordance with aspects of the present invention.

FIG. 5 shows an example environment in accordance with aspects of the present invention. As shown in FIG. 5, environment 500 may include an admin device 210, a transliterated word recognition device 220, and network 230. In embodiments, one or more components in environment 500 may correspond to one or more components in the cloud computing environment of FIG. 2. In embodiments, one or more components in environment 500 may include the components of computer system/server 12 of FIG. 1.

The admin device 210 may include a computing device (e.g., such as computer system/server 12 of FIG. 1). For example, the admin device 210 may correspond to a portable computer device (e.g., a laptop or a tablet computer), a desktop computing device, a server device, or another type of computing device. In some embodiments, the admin device 210 may be used to generate a list of transliterated words to be included in an input file to be used by the transliterated word recognition device 220 to generate a transliterated word recognition dictionary.

The transliterated word recognition device 220 may include one or more computing devices (e.g., such as computer system/server 12 of FIG. 1) that receives an input file of transliterated words, and generates a transliterated word recognition dictionary. The transliterated word recognition device 220 may recognize misspelled or alternatively spelled transliterated words based on the transliterated word recognition dictionary.

The network 230 may include network nodes, such as network nodes 10 of FIG. 2. Additionally, or alternatively, the network 230 may include one or more wired and/or wireless networks. For example, the network 230 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 230 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 500 is not limited to what is shown in FIG. 5. In practice, the environment 500 may include additional devices and/or networks; fewer devices and/or networks; different devices and/or networks; or differently arranged devices and/or networks than illustrated in FIG. 5. Also, in some implementations, one or more of the devices of the environment 500 may perform one or more functions described as being performed by another one or more of the devices of the environment 500. Devices of the environment 500 may interconnect via wired connections, wireless connections, or a combination of wired and wireless connections.

Figure 6:
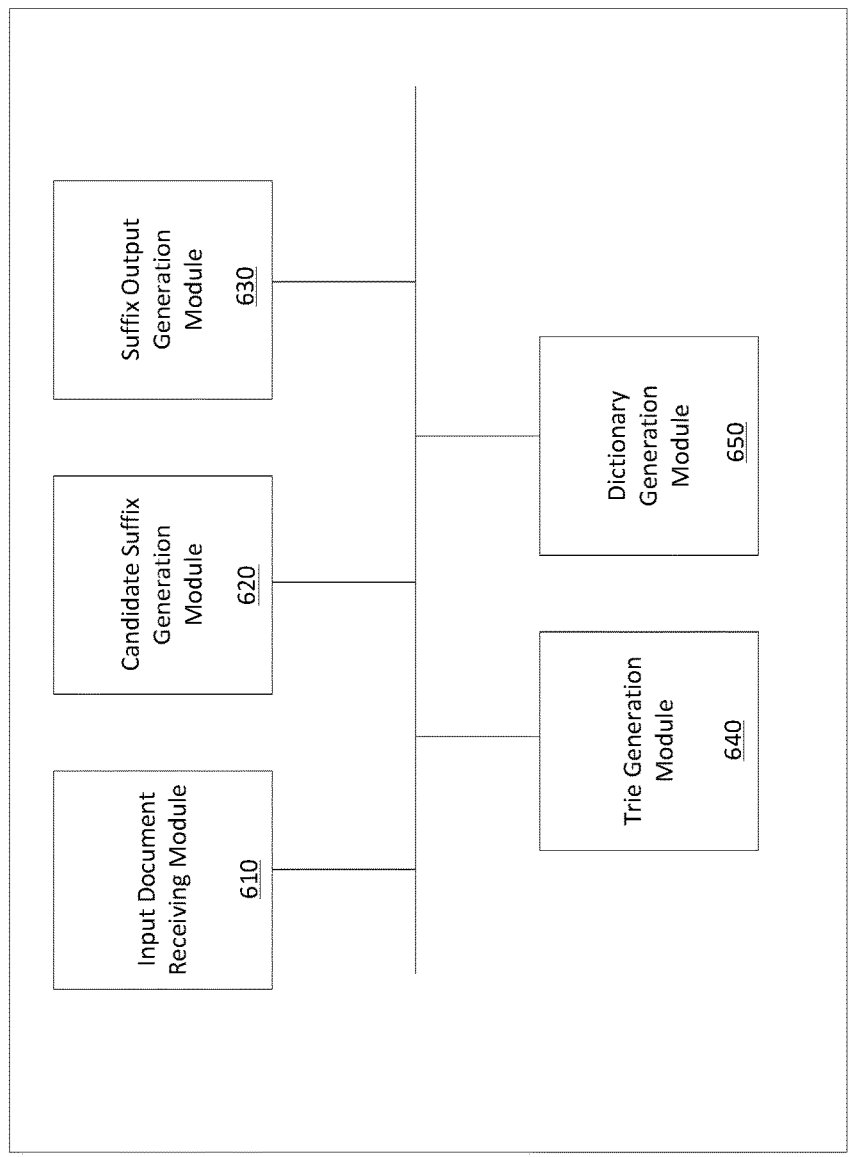
FIG. 6 shows a block diagram of example components of a transliterated word recognition device in accordance with aspects of the present invention.

FIG. 6 shows a block diagram of example components of a transliterated word recognition device in accordance with aspects of the present invention. As shown in FIG. 6, the transliterated word recognition device 220 may include a input document receiving module 610, a candidate suffix generate module 620, a suffix output generation module 630, a trie generation module 640, and a dictionary generation module 650. In embodiments, the transliterated word recognition device 220 may include additional or fewer components than those shown in FIG. 6. In embodiments, separate components may be integrated into a single computing component or module. Additionally, or alternatively, a single component may be implemented as multiple computing components or modules.

The input document receiving module 610 may include a program module (e.g., program module 42 of FIG. 1) that interfaces with the admin device 210 to receive an input file of transliterated words. Additionally, or alternatively, the input document receiving module 610 may include a user interface for a user to provide user input for inputting an input file or obtaining an input file from another source (e.g., from a cloud server, a web server, or the like).

The candidate suffix generate module 620 may include a program module (e.g., program module 42 of FIG. 1) that generates candidate suffixes for each transliterated word included in an input file received by the input document receiving module 610. As described herein, the candidate suffixes may include characters that follow the initial characters in a transliterated word. The candidate suffixes may also include a minimum number of characters (e.g., four, or other configurable number of minimum characters). Additional details regarding the generation of candidate suffixes is described below with respect to FIG. 7.

The suffix output generation module 630 may include a program module (e.g., program module 42 of FIG. 1) that generates suffix outputs based on the candidate suffixes generated by the candidate suffix generate module 620. For example, the suffix output generation module 630 may generate a suffix output file 415 by applying an algorithm (e.g., a python algorithm and/or other algorithm) that identifies candidate suffixes that are present in at least two or more transliterated words included in an input file. Additional details regarding the generation of suffix outputs is described below with respect to FIG. 7.

The trie generation module 640 may include a program module (e.g., program module 42 of FIG. 1) that generates a trie from the suffix outputs generated by the suffix output generation module 630. In embodiments, the trie generation module 640 may generate the trie using any suitable trie generation method. As described in greater detail herein, the trie may encompass the suffix outputs, as well as additional suffixes that stem from the suffix outputs. Examples and additional details regarding the generation of a trie are described in greater detail below with respect to FIG. 8.

The dictionary generation module 650 may include a program module (e.g., program module 42 of FIG. 1) that generates a dictionary (e.g., a transliterated word recognition dictionary) based on the trie generated by the trie generation module 640. The transliterated word recognition dictionary may include all the suffixes that stem from the trie, and map those suffixes to the input transliterated words in the input file. The transliterated word dictionary may be used to recognize alternate spellings of a transliterated word that is present in an electronic document.

Figure 7:
FIG. 7 show example data structures for storing candidate suffixes and suffix outputs in accordance with aspects of the present invention.

FIG. 7 show example data structures for storing candidate suffixes and suffix outputs in accordance with aspects of the present invention. The data and format of the data structures shown in FIG. 7 are illustrative only and in practice, the data structures may store different data, and may be in a different format and arrangement than is shown.

As shown in FIG. 7, a data structure 700 may include entries for a record ID, a field name, and candidate suffixes. Each item under the field name column may include a transliterated word in an input file (e.g., input file 410). In embodiments, the transliterated word recognition device 220 may determine candidate suffixes for each transliterated word (e.g., using the candidate suffix generation module 620), and store the candidate suffixes in a corresponding column in the data structure 700. For example, for the transliterated word "Sutorminskoye", the transliterated word recognition device 220 may generate, using the candidate suffix generation module 620, and store, in the data structure 700, the candidate suffixes "utorminskoye", "torminskoye", "orminskoye", "rminskoye", "minskoye", "inskoye", "nskoye", "skoye", and "koye." In a similar manner, the data structure 700 may store the candidate suffixes for the other transliterated words in the input file.

Based on the candidate suffixes stored by the data structure 700, the transliterated word recognition device 220 may generate suffix outputs 750 (e.g., using the suffix output generation module 630). In embodiments, the suffix outputs 750, may include candidate suffixes that are present in at least two or more transliterated words included in an input file. For example, the suffix "inskoe" would be a suffix output since "inskoe" is present in "alrinskoe", "chutinskoe", and "tuymazinskoe." Similarly, the suffix outputs 750 may also include "koye", "nskoe", "nskoye", "skoe", and "skoye" since each of those suffixes are part of two or more input transliterated words.

Figure 8:
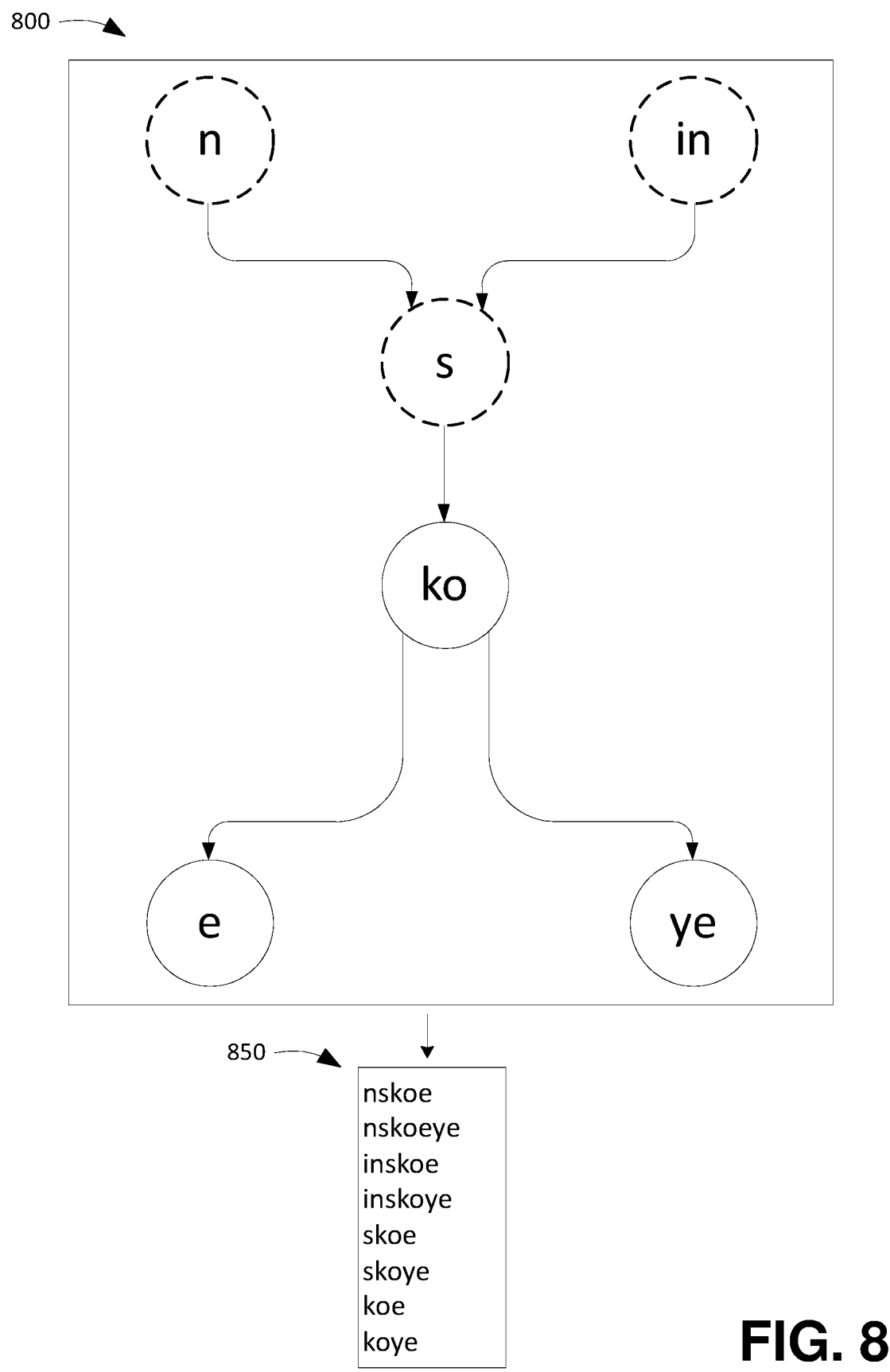
FIG. 8 shows an example implementation of a trie and a transliterated word recognition dictionary in accordance with aspects of the present invention.

FIG. 8 shows an example implementation of a trie and a transliterated word recognition dictionary in accordance with aspects of the present invention. In embodiments, the transliterated word recognition device 220 may generate a trie, such as trie 800. In embodiments, the trie 800 may be based on the suffix outputs, and may be used to generate suffixes to be included in a dictionary 850 (which may correspond to transliterated word recognition dictionary 425) in which the generated suffixes include the suffix outputs and additional suffixes that stem from the suffix outputs. As described herein, the suffixes can be generated by following the branches in the trie. For example, the suffix "nskoe" can be generated from the trie by starting with the "n", followed by "s", "ko", and "e". In a similar manner, the suffix "nskoeye" can be generated from the trie. In embodiments, the transliterated word recognition device 220 may omit generating the trie, but may generate permutations represented by the trie.

As described herein, the dotted characters are optional. That is, suffixes that do not begin with "n" or "in" can be generated, such as "koe" and "koye." As described herein, the dictionary 850 may include suffixes that correspond to input transliterated words. Further, the dictionary 850 may be used to recognize alternate spellings of transliterated words based on the prefix of a transliterated word in a document. For example, if a document contains the word "Arlanskoeye" (e.g., a misspelled or alternatively spelled version of the correctly spelled "Arlanskoye"), the transliterated word recognition device 220 may use the dictionary 850 to determine that the suffix in "Arlanskoeye" is "nskoeye" which is in the dictionary 850. Since the prefix is "Arlan," the word "Arlanskoeye" would be recognized as "Arlanskyoe."

Figure 9:
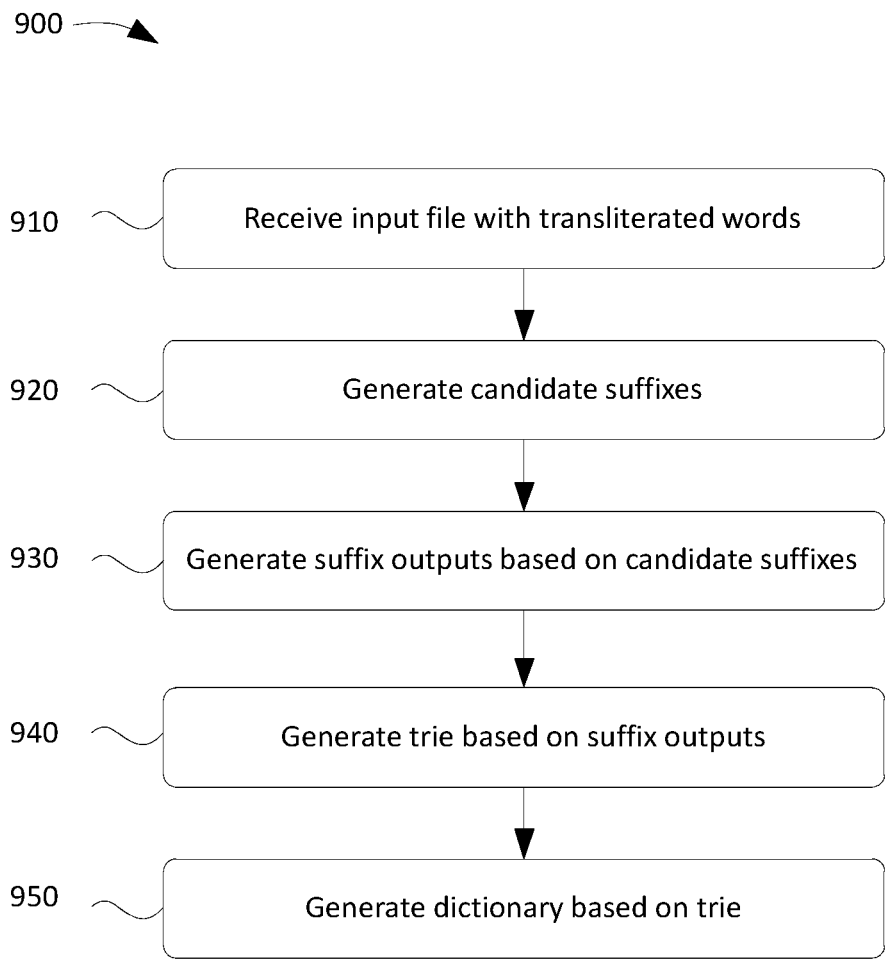
FIG. 9 shows an example flowchart of a process for generating a transliterated word recognition dictionary in accordance with aspects of the present invention.

FIG. 9 shows an example flowchart of a process for generating a transliterated word recognition dictionary in accordance with aspects of the present invention. The steps of FIG. 9 may be implemented in the environment of FIG. 5, for example, and are described using reference numbers of elements depicted in FIG. 5. As noted above, the flowchart illustrates the architecture, functionality, and operation of possible implementations of systems, methods, and computer program products according to various embodiments of the present invention.

As shown in FIG. 9, process 900 may include receiving an input file with transliterated words (step 910). For example, as described above with respect to the input document receiving module 610, the transliterated word recognition device 220 may receive an input file or document having one or more transliterated words. For example, the transliterated word recognition device 220 may receive the input file from the admin device 210. Additionally, or alternatively, the transliterated word recognition device 220 may receive user input having the transliterated words via a user interface, or may obtain the input file from another source (e.g., from a cloud server, a web server, or the like).

Process 900 may also include generating candidate suffixes (step 920). For example, as described above with respect to the candidate suffix generation module 620, the transliterated word recognition device 220 may generate candidate suffixes for each transliterated word included in an input file. As described herein, the candidate suffixes may include characters that follow the initial characters in a transliterated word. The candidate suffixes may also include a minimum number of characters (e.g., four, or other configurable number of minimum characters).

Process 900 may further include generating suffix outputs based on the candidate suffixes (step 930). For example, as described above with respect to the suffix output generation module 630, the transliterated word recognition device 220 may generate suffix outputs based on the candidate suffixes. For example, the suffix output generation module 630 may generate a suffix output file 415 by applying an algorithm (e.g., a python algorithm and/or other algorithm) that identifies candidate suffixes that are present in at least two or more transliterated words included in an input file.

Process 900 may also include generating a trie based on the suffix outputs (step 940). For example, as described above with respect to the trie generation module 640, the transliterated word recognition device 220 may generate a trie from the suffix outputs. In embodiments, the transliterated word recognition device 220 may generate the trie using any suitable trie generation method. As described in greater detail herein, the trie may encompass the suffix outputs, as well as additional suffixes that stem from the suffix outputs.

Process 900 may further include generating a dictionary based on the trie (step 950). For example, as described above with respect to the dictionary generation module 650, the transliterated word recognition device 220 may generate a dictionary (e.g., a transliterated word recognition dictionary) based on the trie generated by the trie generation module 640. The transliterated word recognition dictionary may include all the suffixes that stem from the trie, and map those suffixes to the input transliterated words in the input file. The transliterated word dictionary may be used to recognize alternate spellings of a transliterated word that is present in an electronic document.

Figure 10:
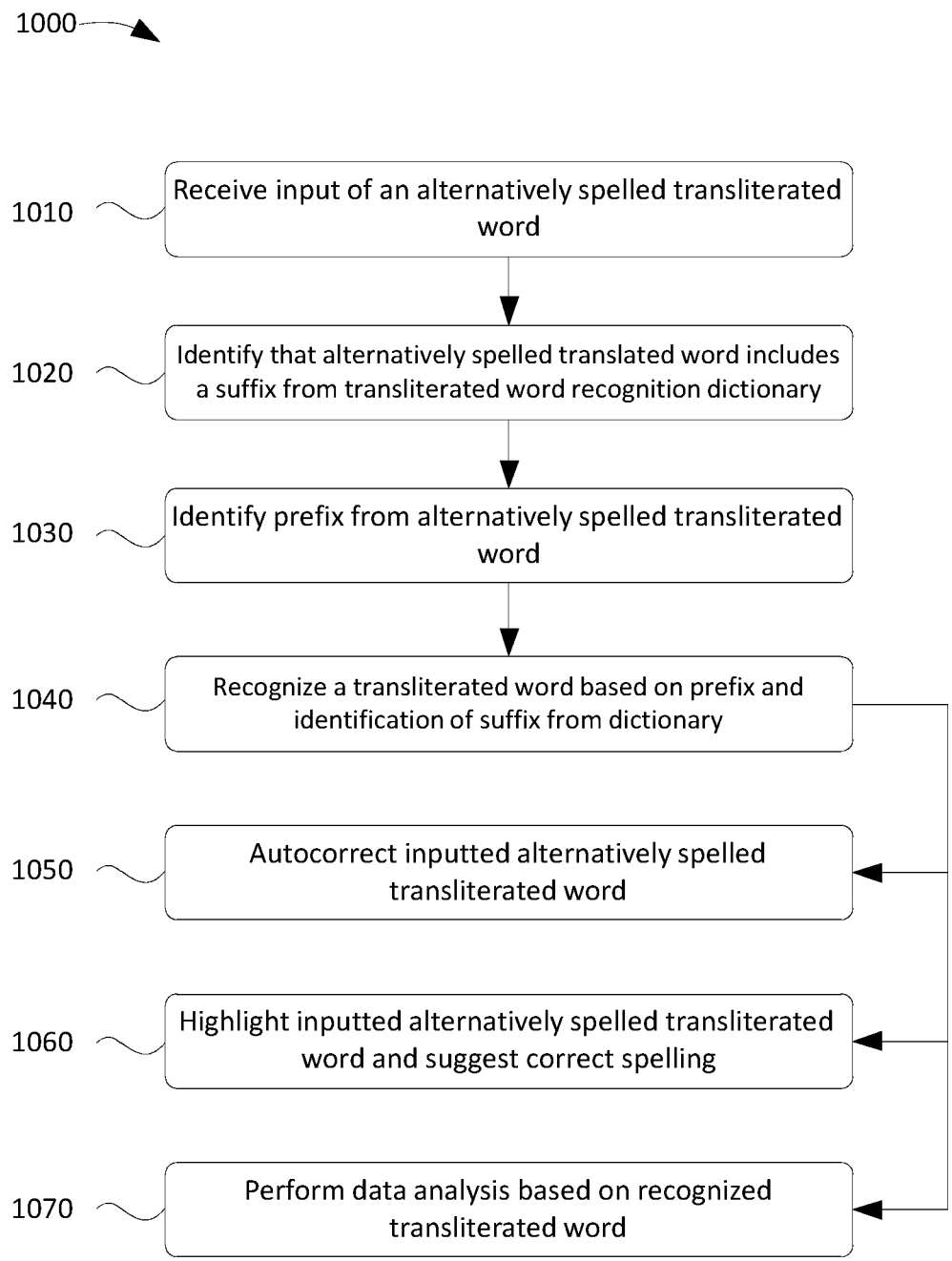
FIG. 10 shows an example flowchart of a process for recognizing an alternatively spelled transliterated word and performing a corresponding action in accordance with aspects of the present invention.

FIG. 10 shows an example flowchart of a process for recognizing an alternate spelling of a transliterated word and performing a corresponding action in accordance with aspects of the present invention. The steps of FIG. 10 may be implemented in the environment of FIG. 5, for example, and are described using reference numbers of elements depicted in FIG. 5. As noted above, the flowchart illustrates the architecture, functionality, and operation of possible implementations of systems, methods, and computer program products according to various embodiments of the present invention.

As shown in FIG. 10, process 1000 may include receiving input of an alternatively spelled transliterated word (step 1010). For example, the transliterated word recognition device 220 may receive input of an alternatively spelled transliterated word (e.g., an alternate spelling of a transliterated word, such as a word that is misspelled, mistyped, etc.). In embodiments, the transliterated word recognition device 220 may receive the input in form of an uploaded document that is in a primary language and has transliterated words in a different language. The transliterated word recognition device 220 may receive the document as part of an instruction to recognize alternatively spelled transliterated words in the document. The transliterated word recognition device 220 may identify the primary language of the uploaded document based on a language of a majority of the words in the uploaded document, and/or a configurable setting indicating the primary language. As another example, the transliterated word recognition device 220 may receive the input of an alternatively spelled transliterated word as a user is typing a document (e.g., word processing document, e-mail, text, etc.). For example, operations of the transliterated word recognition device 220 may be incorporated into a user device (e.g., a smartphone, desktop computer, laptop computer, mobile computer, etc.). The transliterated word recognition device 220 may identify that the user input is not in a primary language (e.g., the language that is set as the system-wide language on the user device).

Process 1000 may further include identifying that the alternatively spelled transliterated word includes a suffix from the transliterated word recognition dictionary (step 1020). For example, the transliterated word recognition device 220 may recognize that a word is a transliterated word originating from a non-primary language (e.g., a language other than the language of the document), and identify that the transliterated word is alternatively spelled (e.g., when the spelling does not match a pre-defined "correct" spelling included in an input file). Further, the transliterated word recognition device 220 may identify that the alternatively spelled transliterated word includes a suffix from the transliterated word recognition dictionary. As an illustrative example, the transliterated word recognition device 220 may determine that the last five characters in the transliterated word includes the suffix "inskoe" and that the suffix "inskoe" is in the transliterated word dictionary. Accordingly, the transliterated word recognition device 220 may determine that the transliterated word should be recognized as one of the transliterated words mapped to the dictionary (e.g., a transliterated word in an input file from which the dictionary is based, such as the input file shown in data structure 700 of FIG. 7).

Process 1000 may also include identifying a prefix from the alternatively spelled transliterated word (step 1030). For example, the transliterated word recognition device 220 may identify a prefix that precedes the identified suffix from the alternatively spelled transliterated word. As an example, if the alternatively spelled transliterated word is "Arlinskoe", the transliterated word recognition device 220 would have recognized the suffix "inskoe" and would thus recognize the prefix "Arl." As described herein, the prefix may allow the transliterated word recognition device 220 to determine which one of the transliterated words mapped to the dictionary corresponds to the alternatively spelled transliterated word.

Process 1000 may further include recognizing a transliterated word based on the prefix and identification of the suffix from the dictionary (step 1040). For example, the transliterated word recognition device 220 may recognize a transliterated word that corresponds to the alternatively spelled transliterated word received at step 1010. As described herein the transliterated word recognition device 220 may determine that the alternatively spelled transliterated word should be recognized as one of the transliterated words in the dictionary based on determining that the alternatively spelled transliterated word includes a suffix in the dictionary. Further, the transliterated word recognition device 220 may determine which one of the transliterated words in the dictionary corresponds to the alternatively spelled transliterated word received at step 1010 based on the prefix. In the above example, the transliterated word recognition device 220 may determine that the alternatively spelled "Arlinskoe" should be recognized as the correctly spelled "Arlanskoye" since the suffix "inskoe" is in the dictionary, and the prefix "Arl" maps to the word "Arlanskoye." In embodiments, the dictionary may map alternative prefixes to a correctly spelled transliterated word in the event that an inputted alternatively spelled transliterated word does not include a correctly spelled prefix.

A variety of use cases may be incorporated based recognizing a transliterated word from an alternatively spelled transliterated word. In general, the transliterated word recognition device 220 may output information based on recognizing the transliterated word. For example, the transliterated word recognition device 220 may output information in the form of autocorrecting an alternatively spelled inputted transliterated word to the corrected spelling (step 1050). In embodiments, the functions of the transliterated word recognition device 220 may be incorporated into a word processing application, e-mail/text application, etc., and transliterated words that are misspelled as the user is inputting them can be autocorrected based on the transliterated word recognition device 220 recognizing the correct spelling of an alternatively spelled transliterated word.

Additionally, or alternatively, the transliterated word recognition device 220 may output information based on the recognized transliterated word by highlighting an inputted alternatively spelled transliterated displaying a suggested corrected spelling (step 1060). In embodiments, the functions of the transliterated word recognition device 220 may be incorporated into a word processing application, e-mail/text application, etc., and transliterated words that are misspelled as the user is inputting them can be highlighted based on the transliterated word recognition device 220 recognizing the correct spelling of an alternatively spelled transliterated word. Also, the correct spelling can be suggested as part of a spell check function.

Additionally, or alternatively, the transliterated word recognition device 220 may output information based on the recognized transliterated such that data analysis may be performed based on the recognized transliterated word versus the alternatively spelled transliterated word (step 1070). For example, when a same transliterated word is spelled multiple different ways, data analysis can be inaccurate since a data analysis system may treat differently spelled words as different variables, even when those differently spelled words should be recognized as the same word and treated as the same variable. Based on recognizing alternatively spelled transliterated words correctly, more accurate data analysis can be performed.

While process 1000 is described in terms of recognizing a transliterated word based on identifying a suffix in the dictionary, in practice process 1000 may be used to recognize a transliterated word based on identifying a prefix in the dictionary, and then using the suffix to identify which one of the transliterated words corresponds to an inputted transliterated word having an alternative spelling. Also, the use cases discussed above are examples only and in practice, are not limited to those discussed above.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    receiving, by a computing device, an input file defining one or more correctly spelled transliterated words;
    generating, by the computing device, a suffix output file of suffix outputs present in the one or more correctly spelled transliterated words;
    generating, by the computing device, a dictionary that maps the suffix outputs in the suffix output file to the one or more correctly spelled transliterated words;
    recognizing, by the computing device, an alternatively spelled transliterated word included in a document as one of the one or more correctly spelled transliterated words using the dictionary; and
    outputting, by the computing device, information corresponding to the recognized transliterated word.

2. The method of claim 1, further comprising generating candidate suffixes for each of the one or more transliterated words included in the input file, wherein the generating the suffix outputs is based on the generating the candidate suffixes.

3. The method of claim 2, wherein the candidate suffixes include characters that follow an initial character of the one or more transliterated words.

4. The method of claim 3, wherein the candidate suffixes include a configurable minimum number of characters.

5. The method of claim 2, wherein the suffix outputs include suffixes that are included in more than one transliterated word in the input file.

6. The method of claim 1, further comprising generating a trie based on the suffix outputs, wherein the generating the dictionary is based on generating the trie.

7. The method of claim 1, wherein the outputting the information corresponding to the recognized transliterated word includes autocorrecting the alternatively spelled transliterated word in a word processor application.

8. The method of claim 1, wherein the outputting the information corresponding to the recognized transliterated word includes highlighting the alternatively spelled transliterated word in a word processor application.

9. The method of claim 1, wherein the recognizing the alternatively spelled transliterated word comprises:
identifying that a suffix in the alternatively spelled transliterated word is included in the dictionary;
identifying a prefix in the alternatively spelled transliterated word; and
mapping the prefix to a particular one of the one or more transliterated words in the input file.

10. The method of claim 1, wherein a service provider at least one of creates, maintains, deploys and supports the computing device.

11. The method of claim 1, wherein the receiving the input file, the generating the suffix outputs, the generating the dictionary, the recognizing the alternatively spelled transliterated word, and the outputting the information corresponding to the recognized transliterated word are provided by a service provider on a subscription, advertising, and/or fee basis.

12. The method of claim 1, wherein the computing device includes software provided as a service in a cloud environment.

13. The method of claim 1, further comprising deploying a system for recognizing alternatively spelled transliterated words in a document, comprising providing a computer infrastructure operable to perform the receiving the input file, the generating the suffix outputs, the generating the dictionary, the recognizing the alternatively spelled transliterated word, and the outputting the information corresponding to the recognized transliterated word.

14. A computer program product for recognizing alternatively spelled transliterated words in a document, the computer program product comprising a computer readable storage medium having program instructions embodied therewith, the program instructions executable by a computing device to cause the computing device to:
receive input including an alternatively spelled transliterated word;
identify that the alternatively spelled transliterated word includes a suffix in a transliterated word recognition dictionary that maps the suffix to a suffix output file of suffix outputs present in a plurality of correctly spelled transliterated words;
identify a particular one of the plurality of correctly spelled transliterated words that corresponds to the alternatively spelled transliterated word; and
output information corresponding to the particular one of the plurality of correctly spelled transliterated words.

15. The computer program product of claim 14, wherein the identifying the particular one of the plurality of correctly spelled transliterated comprises:
identifying a prefix in the alternatively spelled transliterated word; and
mapping the identified prefix with a prefix of the particular one of the plurality of correctly spelled transliterated words.

16. The computer program product of claim 14, wherein the outputting the information corresponding to the particular one of the plurality of correctly spelled transliterated words includes at least one selected from the group consisting of:
autocorrecting alternatively spelled transliterated word;
highlighting the alternatively spelled transliterated word and displaying the particular one of the plurality of correctly spelled transliterated words; and
performing data analysis based on the particular one of the plurality of correctly spelled transliterated words.

17. The computer program product of claim 14, wherein the program instructions further cause the computing device to generate the transliterated word recognition dictionary, wherein the generating the transliterated word recognition dictionary comprises:
receiving an input file identifying the plurality of correctly spelled transliterated words;
generating suffix outputs based on the plurality of correctly spelled transliterated words;
generating the transliterated word recognition dictionary that maps the suffix outputs to the one or more transliterated words.

18. The computer program product of claim 17, wherein the generating the transliterated word recognition dictionary further comprises generating candidate suffixes for each of the plurality of correctly spelled transliterated words included in the input file, wherein the generating the suffix outputs is based on the generating the candidate suffixes.

19. A system comprising:
a CPU, a computer readable memory and a computer readable storage medium associated with a computing device;
program instructions to receive an input file identifying one or more correctly spelled transliterated words;
program instructions to generate prefix outputs present in the one or more correctly spelled transliterated words;
program instructions to generate a dictionary that maps the prefix outputs to the one or more correctly spelled transliterated words;
program instructions to recognize an alternatively spelled transliterated word included in a document as one of the one or more correctly spelled transliterated words using the dictionary; and
program instructions to output information corresponding to the recognized transliterated word,
wherein the program instructions are stored on the computer readable storage medium for execution by the CPU via the computer readable memory.

20. The system of claim 19, wherein the program instructions to recognize the alternatively spelled transliterated word comprise:
program instructions to identify that a prefix in the alternatively spelled transliterated word is included in the dictionary;
program instructions to identify a suffix in the alternatively spelled transliterated word; and
program instructions to map the suffix to a particular one of the one or more transliterated words in the input file.

21. A computer-implemented method comprising:
  receiving, by a computing device, an input file of one or more correctly spelled transliterated words;
  generating, by the computing device, a dictionary that maps suffix outputs or prefix outputs, respectively, to a suffix output file or a prefix output file of suffix outputs or prefix outputs present in the one or more correctly spelled transliterated words;
  recognizing, by the computing device, an alternatively spelled transliterated word included in a document as one of the one or more correctly spelled transliterated words using the dictionary; and
  outputting, by the computing device, information corresponding to the recognized transliterated word.

22. The method of claim 21, wherein the outputting the information corresponding to the recognized transliterated word includes autocorrecting the alternatively spelled transliterated word in a word processor application.

23. The method of claim 21, wherein the outputting the information corresponding to the recognized transliterated word includes highlighting the alternatively spelled transliterated word in a word processor application.

24. The method of claim 21, wherein the outputting the information corresponding to the recognized transliterated word includes performing data analysis based on the recognized transliterated word instead of based on the alternatively spelled transliterated word.

25. A computer program product for recognizing alternatively spelled transliterated words in a document, the computer program product comprising a computer readable storage medium having program instructions embodied therewith, the program instructions executable by a computing device to cause the computing device to:
  receive input including an alternatively spelled transliterated word;
  identify that the alternatively spelled transliterated word includes a prefix in a transliterated word recognition dictionary that maps the prefix to a prefix output file of prefix outputs present in a plurality of correctly spelled transliterated words;
  identify a particular one of the plurality of correctly spelled transliterated words that corresponds to the alternatively spelled transliterated word; and
  output information corresponding to the particular one of the plurality of correctly spelled transliterated words.

* * * * *